US011050924B2

(12) United States Patent
Visa et al.

(10) Patent No.: US 11,050,924 B2
(45) Date of Patent: Jun. 29, 2021

(54) METHOD AND SYSTEM FOR AUTO-SETTING OF CAMERAS

(71) Applicant: CANON KABUSHIKI KAISHA, Tokyo (JP)

(72) Inventors: Pierre Visa, Rennes (FR); Johann Citerin, Betton (FR); Gérald Kergourlay, Chevaigne (FR); Falk Tannhauser, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 16/249,789

(22) Filed: Jan. 16, 2019

(65) Prior Publication Data

US 2019/0230277 A1 Jul. 25, 2019

(30) Foreign Application Priority Data

Jan. 23, 2018 (GB) ..................................... 1801113

(51) Int. Cl.
*H04N 5/232* (2006.01)
*G06T 7/80* (2017.01)
*H04N 19/124* (2014.01)
*H04N 19/154* (2014.01)
*H04N 19/172* (2014.01)

(52) U.S. Cl.
CPC ........... *H04N 5/23216* (2013.01); *G06T 7/85* (2017.01); *H04N 5/232933* (2018.08); *H04N 19/124* (2014.11); *H04N 19/154* (2014.11); *H04N 19/172* (2014.11)

(58) Field of Classification Search
CPC ......... H04N 5/23216; H04N 5/232933; H04N 19/124; H04N 19/154; H04N 19/172; G06T 7/85
See application file for complete search history.

(56) References Cited

U.S. PATENT DOCUMENTS

| 10,028,022 B1* | 7/2018 | Pique Corchs .. H04N 21/44209 |
| 2007/0153891 A1* | 7/2007 | Van Der Stok ........ H04N 19/30 375/240.1 |
| 2012/0212631 A1* | 8/2012 | Klirenko ................ H04N 19/17 348/207.1 |

(Continued)

FOREIGN PATENT DOCUMENTS

| GB | 2556923 A | 6/2018 |
| WO | 2011/055288 A1 | 5/2011 |

*Primary Examiner* — Antoinette T Spinks
(74) *Attorney, Agent, or Firm* — Canon U.S.A., Inc. IP Division (57) ABSTRACT

A method of setting values of camera settings of a camera, the method comprising determining a plurality of sets of objective image parameters values of images captured by the camera, the value of at least one camera setting being different for each set of objective image parameters; obtaining a trade-off value; determining for each set of objective image parameters values, a quality value and a resource consumption value; determining a value of the at least one camera setting optimizing a trade-off between the quality and the resource consumption according to the trade-off value based on the determined quality values and resource consumption values; and setting the value of the at least one camera setting to the determined value.

13 Claims, 8 Drawing Sheets

(56) References Cited

U.S. PATENT DOCUMENTS

| | | | |
|---|---|---|---|
| 2013/0033612 A1* | 2/2013 | Wu | G06T 5/002 |
| | | | 348/208.6 |
| 2015/0199478 A1* | 7/2015 | Bhatia | G16H 30/40 |
| | | | 382/128 |
| 2017/0041826 A1* | 2/2017 | Hersent | H04W 12/02 |
| 2019/0288911 A1* | 9/2019 | Amini | G06K 9/00771 |
| 2020/0380306 A1* | 12/2020 | Hada | G06N 3/0481 |

* cited by examiner

| Image Quality Samples | Storage Consumption (MBytes/s) | Storage Requirement ($) |
|---|---|---|
|  | 5 | 500 |
|  | 2,5 | 250 |
|  | 1 | 100 |
|  | 0,5 | 50 |

Fig. 8

METHOD AND SYSTEM FOR AUTO-SETTING OF CAMERAS

PRIORITY CLAIM/INCORPORATION BY REFERENCE

This application claims the benefit under 35 U.S.C. § 119(a)-(d) of United Kingdom Patent Application No. 1801113.0, filed on Jan. 23, 2018 and entitled "METHOD AND SYSTEM FOR AUTO-SETTING OF CAMERAS". The above cited patent application is incorporated herein by reference in its entirety.

FIELD OF THE INVENTION

The present invention relates to the technical field of camera setting and to a method and a system for auto-setting of cameras, for example auto-setting of cameras within video surveillance systems.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal event detection, traffic monitoring, customer behaviour, or general data gathering.

Conventional video surveillance systems comprise one or more video cameras each capturing raw video data, hereafter called "source flows". Images are encoded by the camera before transmission to a server to be visualized, analysed and stored. The quality of the images is impacted by the settings of the encoder embedded in the camera. Moreover, these settings of the encoder also have an impact on the dimensioning of servers and networks used in the whole system.

For a system integrator of video surveillance systems, it is difficult to manually set the parameters of the cameras to obtain the best image quality according to the mission. There are many parameters to handle and it is very time-consuming. It is also difficult to dimension the hardware infrastructure to support the recording of all video streams existing in the system. The amount of required disk space depends on the retention period, e.g. 90 days, of the recorded images, the bitrate of the video streams and the percentage of time with motion in the scenes to capture if the recording is active only when motion is detected.

The image parameters of cameras define the bitrate of the cameras video streams, which can be either constant bitrate or variable bitrate streams. The higher the video bitrate, the higher is the consumption of resources for storage. A way to save hardware storage cost is therefore to optimize image parameters so as to fulfil the cameras mission, namely with a good enough image quality for display or for video content analysis (VCA) while minimizing the bitrate of video streams.

If the image parameters are not tuned correctly, the video bitrate may be higher than needed resulting in a waste of storage resources. It is the case, for example, if the image resolution of the camera is set to full HD corresponding to 1920×1080 while a resolution of 640×480 pixels would have been sufficient to correctly recognize the targets. Also, a frame rate of 10 frame per second (fps) may be sufficient to record a scene and to be sure to capture few images of each target crossing the region of interest. In such a case, there is no need to set a high frame rate like 25 fps.

Besides, the video bit rate depends on the complexity of the images to be encoded. The complexity of an image depends on the characteristics of the captured scene: at constant encoding quality and frame rate, the bitrate increases with the level of noise, the level of motion, and the level of details to be encoded. In video surveillance systems, the level of noise can be high as cameras are commonly installed in place with low lighting conditions like, for example, a sub-way corridor.

Usually video surveillance systems are dimensioned based on rough theoretical estimate of each video stream to calculate the requirements for disk space based on a first evaluation of the image quality required for each camera.

During installation of the system, the system integrator proceeds to the configuration of the settings of each camera based on specification. It comprises typically the setting of the camera orientation, zoom, image resolution, frame rate, encoding quality, defining the compression level, and physical parameters based on the current images. Several parameters values are tested, even all the possible combination in some cases. This process can be very time consuming.

If there is a problem later on like, for example, storage resource consumption higher than expected or quality issues at night or during specific occasions, the system integrator needs to review the settings and even sometimes to upgrade the hardware setup.

It occurs that the initial cameras settings are rarely optimal as they are determined based on the knowhow of the integrator. These settings are only reviewed when facing major problems in operation. Most of the cameras usually remain with their initial settings. Multiple interventions of the system integrator are needed to finalize the setup of the system.

SUMMARY OF THE INVENTION

The present invention has been devised to address one or more of the foregoing concerns. In this context, there is provided a solution for an automatic settings of cameras aiming to optimize a trade-off between the images quality obtained from the network cameras and the resource consumption needed for storage of the images.

According to a first object of the invention, there is provided a method of setting values of camera settings of a camera, the method comprising:
  determining a plurality of sets of objective image parameters values of images captured by the camera, the value of at least one camera setting being different for each set of objective image parameters;
  obtaining a trade-off value;
  determining for each set of objective image parameters values, a quality value and a resource consumption value;
  determining a value of the at least one camera setting optimizing a trade-off between the quality and the resource consumption according to the trade-off value based on the determined quality values and resource consumption values; and
  setting the value of the at least one camera setting to the determined value.

Accordingly, a camera setting is determined and setup automatically allowing to get a fair trade-off between the quality of the images as needed by the application and the corresponding resource consumption, in particular disk storage, by the system. It is possible to get the best possible quality fitting the hardware resources provided by the system.

Optional features of the invention are further defined in the dependent appended claims.

According to a second object of the invention, there is provided a device for setting values of camera settings of a camera, the device comprising a microprocessor configured for carrying out the steps of:

determining a plurality of sets of objective image parameters values of images captured by the camera, the objective image parameters being dependent on the camera settings, the value of at least one camera setting being different for each set of objective image parameters;

obtaining a trade-off value;

determining for each set of objective image parameters values, a quality value and a resource consumption;

determining a value of the at least one camera setting optimizing the trade-off between the quality value and the resource consumption according to the trade-off value; and setting the value of the at least one camera setting to the determined value.

The second aspect of the present invention has optional features and advantages similar to the first above-mentioned aspect.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which:

FIG. 4 is a block diagram illustrating an example of steps carried out during a calibration phase of an auto-setting method as illustrated in FIG. 3a.

DETAILED DESCRIPTION OF EMBODIMENTS OF THE INVENTION

According to embodiments, a new auto-setting method is provided. It comprises several phases among which a learning phase and a calibration phase for obtaining information and an operation phase for dynamically auto-setting a camera in any situation for optimizing a trade-off between the images quality and the resource consumption.

Figure 1:
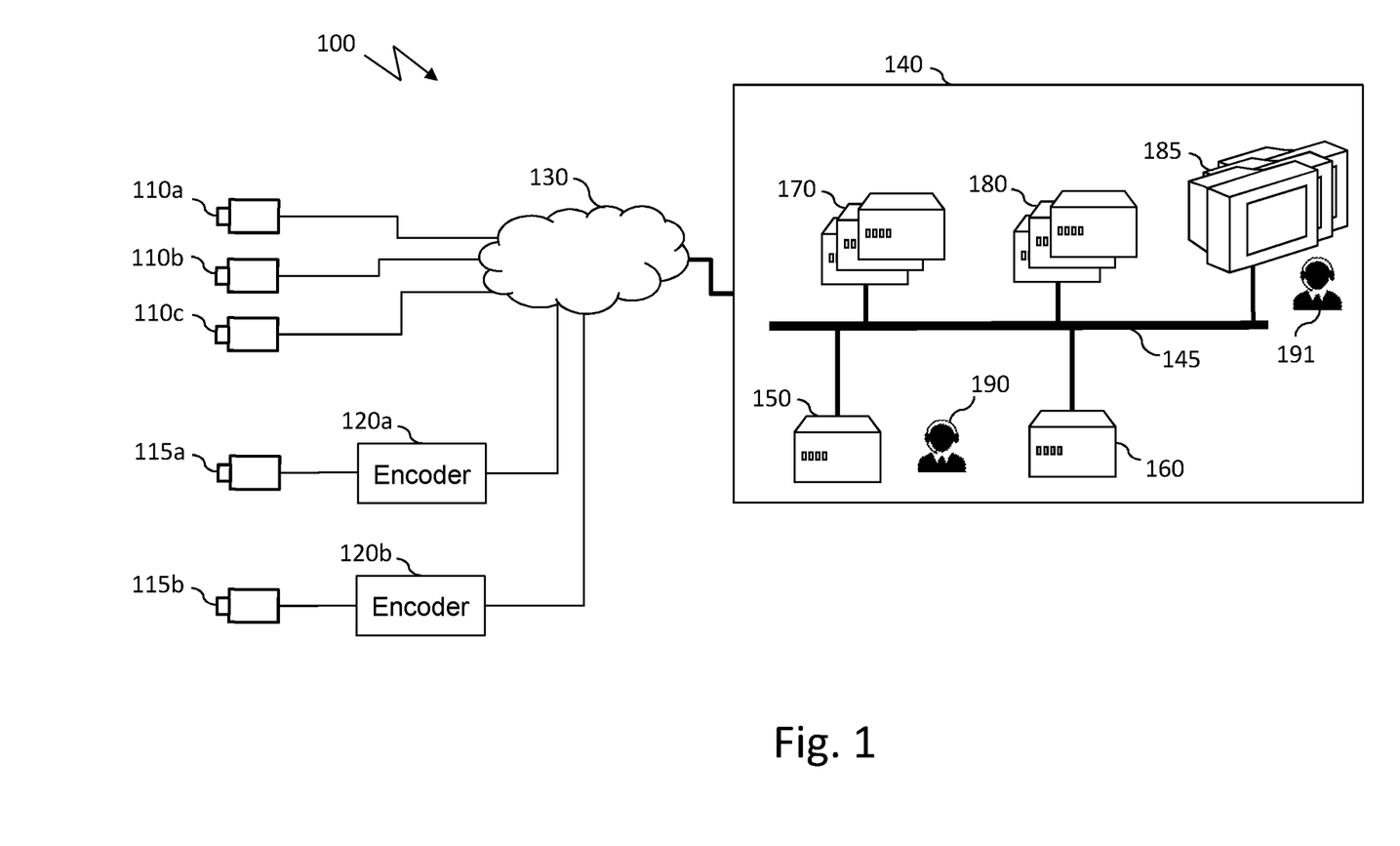
FIG. 1 schematically illustrates an example of a video surveillance system wherein embodiments of the invention may be implemented.

FIG. 1 schematically illustrates an example of a video surveillance system wherein embodiments of the invention may be implemented.

Video surveillance system 100 includes a plurality of network cameras denoted 110a, 110b, and 110c, for example network cameras of the Internet Protocol (IP) type, generically referred to as IP cameras 110, and a plurality of video encoders denoted 120a and 120b, generally referred to as video encoders 120, which may be connected to one or more network cameras, for example to IP or analogue cameras 115a and 115b.

Each network camera 110 and each set composed of a network camera 115 and a video encoder 120, is referred to as a source device or to a camera. All cameras are connected to a central site 140 via a backbone network 130. In a large video surveillance system, backbone network 130 is typically a wide area network (WAN) such as the Internet. A camera in the following is defined as being composed by an image capturing device associated with a video encoder. The video encoder may be embedded in the camera or external to the camera itself. A camera entity is considered as being composed of both the actual camera and the encoder. Similarly, the settings of the encoder are considered as being part of the camera settings in line with the encoder being considered as being part of the camera.

According to the illustrated example, central site 140 comprises a video manager system (VMS) 150 used to manage the video surveillance system, an auto-setting server 160 used to perform an automatic setting of cameras 110, and a set of recording servers 170 configured to store the received video streams, a set of video content analytics (VCA) servers 180 configured to analyse the received video streams, and a set of displays 185 configured to display received video streams. All the modules are interconnected via a dedicated infrastructure network 145 that is typically a local area network (LAN), for example a local area network based on Gigabit Ethernet.

Video manager system 150 may be a device containing a software module that makes it possible to configure, control, and manage the video surveillance system, for example via an administration interface. Such tasks are typically carried out by an administrator (e.g. administrator 190) who is in charge of configuring the overall video surveillance system. In particular, administrator 190 may use video manager system 150 to select a source encoder configuration for each source device of the video surveillance system. In the state of the art, it is the only means to configure the source video encoders.

The set of displays 185 may be used by operators (e.g. operators 191) to watch the video streams corresponding to the scenes shot by the cameras of the video surveillance system.

The auto-setting server 160 contains a module for setting automatically or almost automatically settings of cameras 110. It is described in more detail by reference to FIG. 2.

Administrator 190 may use the administration interface of video manager system 150 to set input parameters of the auto-setting algorithm described with reference to FIGS. 3 to 7, carried out in in auto-setting server 160.

As alternative embodiment, the auto-setting server 160 can be integrated in the video management system 150. In addition, there may be several recording servers 170, several VCA servers 180, and several displays 185 located in different geographical sites of the video surveillance system.

Besides, each recording server 170 is associated to a set of cameras. The type of storage disk may be Hard Disk Drive (HDD) or Solid State Drive (SSD). The architecture may be JBOD (Just a Bunch Of Disks) or may include redundancy with a RAID (Redundant Array of Independent Disks) controller.

An objective of the invention is to propose an auto-setting method for the parameters of the cameras in order to guarantee a user-defined trade-off between the image qualities obtained from the network cameras and the consumption of the storage resources in the recording servers. The required image quality may be different from one camera to another, or it may be the same for all cameras. Besides, the storage resource consumption may be different from one camera to another. Indeed, a camera capturing a crowded corridor will consume more storage resources than a camera capturing the entrance of a warehouse without traffic. This is particularly true when the recording is triggered on the detection of motion in the scene.

The physical parameters of the camera, e.g. gain, shutter speed, and the image parameters may be defined using the auto-setting method. The list of image parameters subjected to the auto-setting method may differ from one camera to another, but typically in video surveillance systems these parameters are:

The picture resolution in pixels which corresponds to the total number of pixels in horizontal and vertical dimensions of each image of the captured video;

The frame rate which corresponds to the number of individual encoded video frames transmitted per unit of time;

The video encoding algorithm. Two well-known encoding standards are used in video surveillance systems: Motion-JPEG (MJPEG) and H.264 (H.265 is not yet largely deployed). Usually, H.264 encoders are more efficient than MJPEG encoders. This means that for the same resulting image quality, the average bitrate of a H.264 video stream is lower than for an MJPEG video stream. However, the peak bitrate is not always better due to intra frames encoding which is not better in H.264 than in MJPEG. In video surveillance system, MJPEG is sometimes still preferred, but this may also evolve with the deployment of H265 encoding technology in cameras. For H.264, different profiles are available and three of them are very common: baseline profile, main profile, and high profile. The latest is the most efficient in terms of image quality, but with the highest cost of implementation, and the highest processing requirements;

The group of pictures (GOP) for H.264 encoder, defining the number and the period of key frames (i.e. I-Frames), and the number of predicted frames (i.e. P, B-Frames). Usually in video surveillance system, only I-Frames and P-Frames are generated, and the bitrate of the video stream increases if the ratio of I-Frames increases.

The rate control mode which is a parameter used for controlling the bitrate generated by the encoder. Most of H.264 encoders support three different rate control modes: Constant Bit Rate (CBR), Variable Bit Rate (VBR), and Maximum Bit Rate (MBR):

In VBR mode, the bitrate is automatically adapted by the encoder to match a desired image quality. The image quality is defined by a parameter called quantization factor and usually denoted Qp.

In CBR mode, the image quality is adapted to match a target bitrate corresponding to the maximum authorized bitrate. This parameter is referred to as target bitrate.

The MBR mode is similar to a VBR mode but with a maximum authorized bitrate which cannot be overcome.

With CBR mode and MBR mode, if the encoded video bitrate exceeds the value set for the target bitrate or maximum bitrate parameter, then the encoder adjusts the frame rate or the quantization factor to meet the defined limit. The user can set the priority to either the frame rate or the quality. If set to the frame rate, the encoder increases the quantization factor (i.e. lowers the image quality), while it lowers the frame rate when the priority is given to the quantization factor. In any case, the quality of the image is decreased if the complexity of images increases. At constant compression quality and frame rate, the bitrate increases with the level of noise, the level of motion, and the level of details to be encoded. Usually, the interesting video parts concern the sequences with motion (e.g. moving people or moving cars). As a consequence, the drawback of CBR mode is that the image quality may decrease for the most interesting video sequences.

VBR mode is more appropriate as the video bitrate decreases when there is low motion in the scene. The drawback is to potentially generate unpredictable and high variation of the encoded bit rate in case of high motion; then it becomes very difficult to forecast the system requirements in terms of storage capacity. Therefore, MBR mode is the recommended mode for video surveillance system: the bitrate is capped preventing some high peaks when the complexity of the scene increases. This mode is available in recent cameras.

The invention is applicable as soon as there are some parameters which have an impact on the bitrate of video stream, and therefore on the consumption of storage resource. In the rest of the description, we consider as example of embodiment:

H.264 encoding (best available profile) and VBR mode,

Image resolution chosen according to the display screen resolution (if the mission is "display"), or the density of pixels per target (if the mission is VCA analysis), Frame rate set according to the requirement for a smooth display (if the mission is "display"), or according to the minimum number of images per target to be captured (if the mission is VCA analysis), GOP fixed: for instance one I-Frame per second.

For physical parameters, we choose to set the maximum shutter value according to the velocity of targets, and to let the camera applying the auto-exposure mode to set the other physical parameters.

The remaining parameter to set is the quality of encoding of the H.264 encoder. Typical cameras offer a setting parameter to define the quality of encoding which depends on the level of compression. This quality of encoding may be expressed as a value in a scale. For example some cameras offer 5 different qualities of encoding, some others offer 100 different qualities of encoding. The encoder defines some internal settings based on the selected quality of encoding. This quality of encoding is generally the main setting at the user disposal to define the encoder behaviour.

All these different parameters constitute the camera settings.

In case of MJPEG encoding, the parameter to set would also be the quality of encoding of the MJPEG encoder. This is equivalent to the case of H.264 encoder in VBR mode.

As a variant, in case of CBR mode, the parameter to set would be the target bitrate of the H.264 encoder.

As another variant, the parameters to set would be both the quality of encoding and the frame rate (or other combinations of variables).

Figure 2:
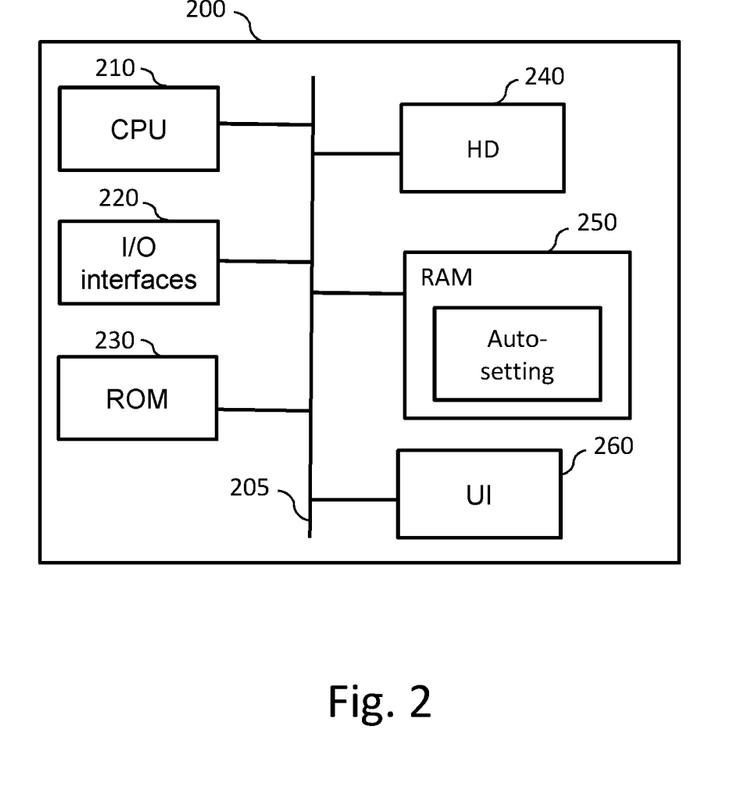
FIG. 2 is a schematic block diagram of a computing device for implementing embodiments of the invention.

FIG. 2 is a schematic block diagram of a computing device for implementing embodiments of the invention. It may be embedded in auto-setting server 160 described with reference to FIG. 1.

The computing device 200 comprises a communication bus connected to:
- a central processing unit 210, such as a microprocessor, denoted CPU;
- an I/O module 220 for receiving data from and sending data to external devices. In particular, it may be used to retrieve images from source devices;
- a read only memory 230, denoted ROM, for storing computer programs for implementing embodiments;
- a hard disk 240 denoted HD;
- a random access memory 250, denoted RAM, for storing the executable code of the method of embodiments of the invention, in particular an auto-setting algorithm, as well as registers adapted to record variables and parameters;
- a user interface 260, denoted UI, used to configure input parameters of embodiments of the invention. As mentioned above, an administration user interface may be used by an administrator of the video surveillance system.

The executable code may be stored either in random access memory 250, in hard disk 240, or in a removable digital medium (not represented) such as a disk of a memory card.

The central processing unit 210 is adapted to control and direct the execution of the instructions or portions of software code of the program or programs according to embodiments of the invention, which instructions are stored in one of the aforementioned storage means. After powering on, CPU 210 may execute instructions from main RAM memory 250 relating to a software application after those instructions have been loaded, for example, from the program ROM 230 or hard disk 240.

Figure 3A:
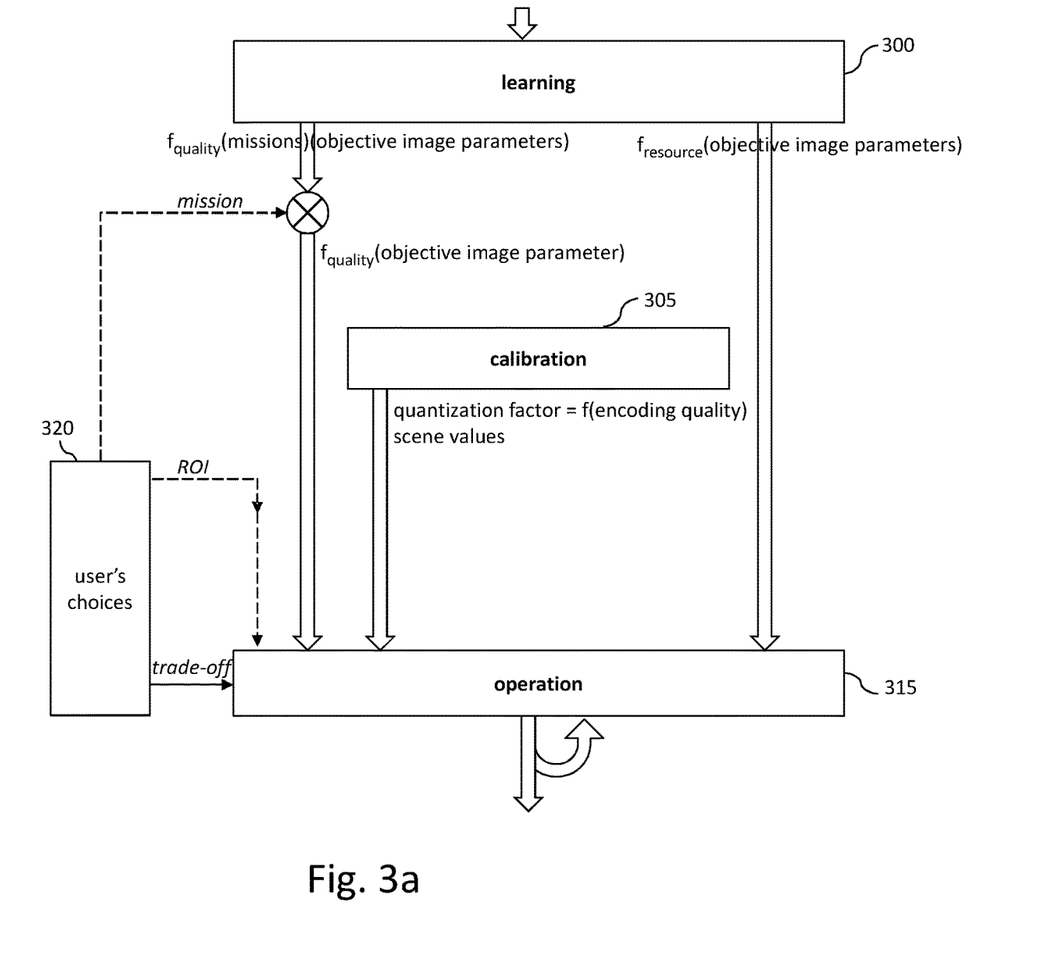
FIG. 3a is a block diagram illustrating an example of an auto-setting method making it possible to set automatically parameters of a source device according to embodiments of the invention.

FIG. 3a is a block diagram illustrating an example of an auto-setting method making it possible to set automatically parameters of a source device, typically a camera, according to embodiments of the invention.

As illustrated, a first phase is a learning phase (reference 300). According to embodiments, it is performed before the installation of the considered camera, for example during the development of a software application for processing images. Preferably, the learning phase is not specific to a type of camera (i.e. it is advantageously generic).

During this phase, a first relation or a first function is established between a quality value relating to the result of the image processing and all or most of the relevant variables that are needed to estimate such a processing result quality. These relevant variables are called the objective image parameters. The objective image parameters are typically some variables that may be measured on the resulting images and that have an impact on the perceived quality of the resulting images. They may include image quality-dependent parameters, like for example blur, noise and contrast, and/or scene-dependent parameters like the targets size or the targets velocity. They may also include parameters concerning the compression of the video stream generated by the camera like the quantization factor, or quantization parameter, known as Qp. This quantization factor Qp is used by the encoder when quantizing the coefficients of the Fourier transform of blocks of pixels, typically residual blocks of pixels. After the Fourier transform, the block of pixels is transformed into a block of coefficients. These coefficients are quantized, generally the quantization consists in a right shift of the coefficients values. This quantization results in some coefficients being set to zero while the range extension of the remaining coefficients is reduced. As a result, the encoding of these blocks of coefficient needs less data. The quantization is the main operation that impact the compression level in an encoder. In this way the quantization factor Qp is an objective measure of the level of compression. As described hereafter, the relation or function, denoted quality function, depends on a type of the missions that can be handled by the camera.

Still during the learning phase, a second relation or a second function denoted resource function, is established between the consumption of a resource (e.g. the storage resource), and all or most of the objective image parameters that have an impact on this resource consumption.

An objective of the learning phase is to obtain a quality function and a resource function which are able to state prima facie the quality of an image in the context of a particular mission, and the resource consumption that is associated, as a function of the objective image parameters which have an impact on the mission.

According to particular embodiments, the output of the learning phase comprises a quality function that may be expressed as follows:

$$f_{quality}(\text{missions})(\text{image quality, scene})$$

where,
- missions is a type of mission;
- image quality is a set of objective image parameters that may comprise a blur value, a noise value, a contrast value, and an encoding value, typically the quantization factor; and
- scene is a set of parameters that may comprise a target size and a target velocity.

The output of the learning phase also comprises a resource function that may be expressed as follows:

$$f_{resource}(\text{image quality, bitrate})$$

where,
- image quality is a set of objective image parameters that may comprise a noise value and an encoding quality value; and bitrate is a set of objective image parameters that may comprise, in case of H.264 encoding, the size of I-Frame and the size of P-Frame. Indeed, the H.264 video stream bitrate depends on the encoding quality (i.e. the quantization factor) and on the complexity of the captured images (level of motion, level of image noise, level of details). Besides, the mean sizes of I-Frames and P-Frames decrease when the quantization factor of the encoder increases (i.e. when the compression level increases). In addition, the mean size of I-Frames increases with the level of details and the level of noise in the images. The level of motion has almost no impact on I-Frames. The mean size of P-Frames increases with the level of motion and with the level of noise in the images. As a consequence, instead of measuring separately each parameter (current bitrate, motion, noise, details), it is feasible to measure in real-time the mean size of I-frames and P-frames of the encoded bit stream as the average size of I-frames and P-frames are representative of the levels of motion, noise and details. A Group Of Picture of length GOP includes one I-Frame and a plurality of P-Frames. With a frame rate referred as fps, the bitrate B of the video stream is:

$$B = fps*(I\_Frame\_Size + (GOP-1)P\_Frame\_Size)/GOP$$

Where I_Frame_Size is the size of the I-Frame, GOP is the number of frames in a GOP and P_Frame_Size is the size of a P-Frame.

Therefore, in particular embodiments, the output of the learning phase may be expressed as follows:

$$f_{quality}(\text{missions})(\text{noise, blur, contrast, quantization factor, target\_size, target\_velocity});$$

and $$f_{resource}(\text{noise, quantization factor, } I\text{-Frame size, } P\text{-Frame size}).$$

It is to be noted that the variation of the I-Frame and P-Frame sizes versus the quantization factor is slightly dependent on the level of noise. As the noise is also a variable for the quality function, it can be kept also as a variable for the resource function.

The quality function $f_{quality}$ and the resource function $f_{resource}$ resource may be a mathematical relation or an n-dimensional array associating a quality value with a set of n parameter values (e.g. values of noise, blur, contrast, quantization factor, target size, target velocity for the quality function). For the sake of illustration, the quality function may be scaled between 0 (very low quality) and 1 (very high quality), and the resource function may be scaled between 0 (no resource consumption) to 1 (very high resource consumption).

The quality function may be built by manually rating the quality of images obtained from various network cameras and with various level of noise, blur, contrast, quantization factor, target size, and target velocity. Then a regression is applied on the obtained dataset to generate the quality function.

A resource dataset can be built by measuring the size of I-Frames and P-Frames of video streams at the output of various video cameras and for various levels of noise and quantization factors. The gain parameter of the camera may be modified to create the different levels of noise in the captured images. Also the encoding quality can be sequentially modified to create video streams with different quantization factors. Two dataset are generated: one dataset comprising the values of I-Frame size associated to each value of noise and quantization factor, and one dataset comprising the values of P-Frame size associated to each value of noise and quantization factor. Then two independent regressions are applied on the obtained dataset to generate two functions composing the resource function.

This split into two functions is specific to H.264 encoding in VBR mode. In CBR mode, the video stream bitrate is almost constant (directly known by the target bitrate setting in the camera), and with MJPEG encoding there is a unique type of frame.

As denoted with reference 320, the type of mission to be handled by the camera may be chosen by the customer (i.e. the user of the system) during installation of the camera or later on. Likewise, a user may select a region of interest (ROI) corresponding to a portion of an image to be processed. As illustrated with the use of dotted lines, this step is optional.

As illustrated, after a user has selected a type of mission, the quality function obtained from the learning phase may be written as follows:

$$f_{quality}(\text{image quality, scene})$$

or, according to the given example:

$$f_{quality}(\text{noise, blur, contrast, quantization factor, target size, target velocity})$$

Alternatively, the camera may be configured for a particular type of mission and the whole captured scene may be considered.

A second phase (reference 305) is directed to calibration. This is typically carried out during installation of the camera. The calibration phase aims at obtaining at least some of the objective image parameters for a given camera used in situation for a given mission. These objective image parameters depend on the global settings of the camera. The global settings of the camera are all the settings that have an impact on the quality of the resulting images and the consumption of resources. These global settings include the actual settings of the camera, meaning the physical parameters of the optical part of the camera, like for example the gain and the shutter speed. The global settings include also settings that depends on the situation of the camera at the scene. The settings depending on the situation of the camera are implicitly used in calibration by working on images taken in situation by the given camera. The global settings also comprise the settings of the encoder used to generate the video stream, namely the encoding quality parameter. The calibration therefore aims at measuring at least some of the objective image parameters from the actual scene according to the settings of the camera, as well as at obtaining objective image parameter values depending on the camera used in situation. This may take from a few minutes to a few tens of minutes and the process is described in FIGS. 4 and 5. According to embodiments, the calibration phase is run only once.

The objective image parameters output by this phase may comprise scene values (for example target size and target velocity), and the creation of a look-up table providing the relation between the encoding quality setting in the camera (i.e. compression level) and the resulting quantization factor used by the encoder. This information is necessary to make the link between the resource function and the camera. Indeed, the quantization factor Qp is considered as a standard parameter while the encoding quality range varies from one camera manufacturer to another.

The third phase (reference 315) is directed to operation. It is performed during the operational use of the camera to improve its settings. It is preferably executed in a very short period of time, for example less than one second, and without perturbation for the camera, except for changing camera settings (i.e. it is a non-invasive phase). It is used to select suitable camera settings, preferably the most suitable camera settings according to a desired trade-off between the image quality and the resource consumption. Some objective image parameters that have not been calculated during the calibration may be calculated during operation. This may be the case of the blur, noise and contrast. Due to the influence of the current condition, like weather and ambient light, on this parameter, it may be advantageous to determine these parameter during operation instead of calibration.

The trade-off is represented by a parameter β. It measures how "costly" is the resource. The trade-off value β is typically defined by the user 320. The output of the operation phase provides the camera setting (i.e. the encoding quality in our example) that maximizes the equation fscore=$f_{quality}$−β*$f_{resource}$, where $f_{quality}$ and $f_{resource}$ are the functions determined in the learning phase 300 and calibrated during the calibration phase.

As explained above, the learning phase establishes a relation between both a quality value and a resource consumption and objective image parameters. The calibration phase establishes a relation between some objective image parameters and the global setting of the camera. Using these relations allows to establish a relation between both a quality value and a resource consumption and the actual settings of the camera. It becomes possible to adjust at least one of the global settings to optimize a trade-off between image quality and resource consumption.

This phase can be performed at regular interval of time. It is preferably carried out each time a new change of camera settings is needed. The environmental conditions, typically lighting and traffic, may change along the time. Accordingly, the camera settings must be adjusted to fit the current environmental conditions.

Figure 3B:
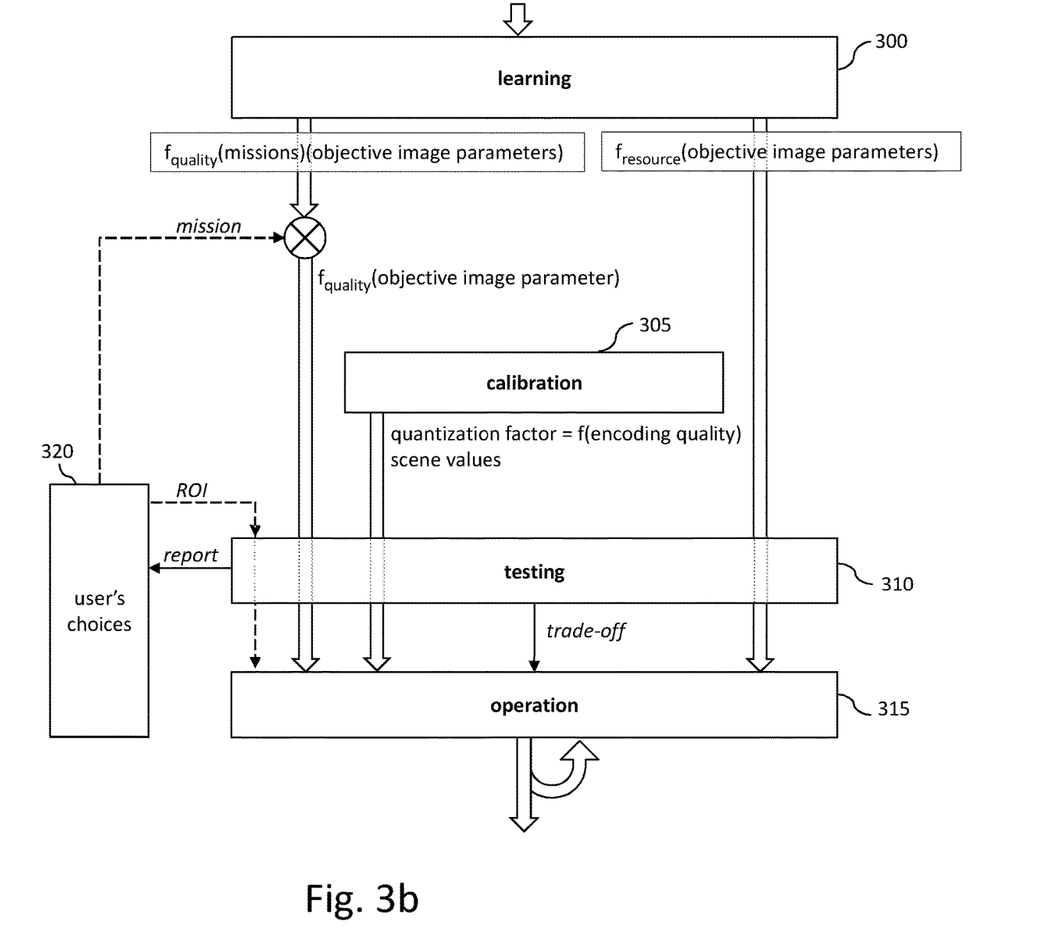
FIG. 3b correspond to FIG. 3a further comprising a testing phase for the choice of a trade-off value.

It may prove difficult for the user of the system to figure out a relevant value of the trade-off parameter β. In order to help the user in the choice of a relevant trade-off value for his application, an optional testing phase may be conducted. This optional testing phase is illustrated by FIG. 3b. FIG. 3b is similar to FIG. 3a but for the addition of the testing phase 310.

The testing phase aims at generating a report providing the image qualities obtained with the network cameras versus the consumption of the storage resource. The detailed steps of this phase are described in relation with FIG. 7. This phase consists in launching the auto-setting of each camera of the system corresponding to the execution of the operation phase 315. The execution of the operation phase is repeated for several values of β that are tested sequentially.

The duration of the operation phase for each value of β shall be long enough to be representative of the typical environmental conditions that will be encountered during the lifetime of the system. For instance, the tested values of β could be the values between 0.2 and 2 by step of 0.2. The lower values of β represent cases where the customer gives priority to the quality of images despite a high storage resource consumption, while the higher values of β represent cases where the customer does not care so much about the image quality and prefers low storage resource consumption.

For each tested value of β, several samples of images are captured for each camera and the average bitrate of the associated video stream is measured. The image samples provide the information about which image quality can be expected, and the bitrate provides the information about the excepted storage resource consumption in such configuration.

The whole testing phase 310 is executed during a period of time that could last several hours, and up to several days if necessary, in order to cover various environmental conditions for each tested trade-off parameter value β. The output of the testing phase 310 is a report illustrated in the FIG. 8. This report is submitted to the customer's choice (step 320) to select a trade-off between quality and cost. The result of this choice determines a nominal value of the trade-off parameter β which is used by the operation phase once the video surveillance system is set-up.

This testing phase 310 permits to the user a choice based on an actual quality of images that may be visualized using the captured samples and the corresponding cost in term of actual disk size or cost. The user do not need to be aware of the actual trade-off parameter β value implicitly determined as corresponding to his choice.

Figure 4:
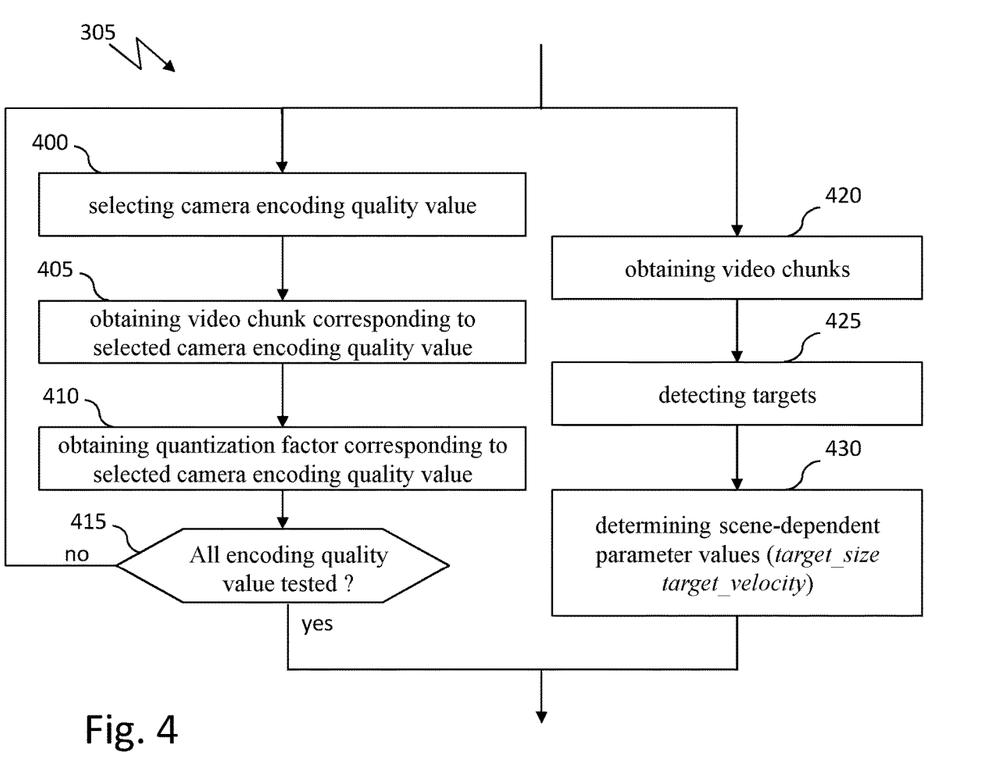

FIG. 4 is a block diagram illustrating an example of steps carried out during a calibration phase of an auto-setting method as illustrated in FIG. 3a. For each camera, the objectives of the calibration phase are:
- to establish (steps 400, 405, 410) the relation between the encoding quality setting in the camera and the quantization factor used by the encoder, and
- to measure in-situ (steps 420, 425, 430), on the actual camera and the actual scene, some of the objective image parameters that are required to calculate a quality value from an $f_{quality}$ function as determined during the learning phase.

This phase is applied to all cameras in the system. The steps of FIG. 4 shall be repeated for each camera.

The step 400 consists in setting an encoding quality value in a given camera. In step 405, one or several video chunks, meaning short sequences of consecutive images, are recorded after the setting of the encoding quality value. In step 410, the quantization factor Qp is extracted from the video chunks, for instance by using the well-known FFmpeg software tool. A correspondence is then established between a value of encoding quality and a quantization factor value. The step 415 is used to test if all possible encoding quality values have been tested.

In case of CBR mode, the objective is to determine the highest expected quantization factor corresponding to each target bitrate setting in the camera. For a given target bitrate, the value of QP will fluctuate according to the level of motion, complexity, noise of images to be encoded. The highest value of Qp corresponds to the worst image quality. In CBR mode, step 400 consists in selecting a target bitrate to test, and step 410 is applied to extract the highest Qp value of the video chunk(s). In step 415, it is then checked if all target bitrates have been tested. The result of the calibration is a correspondence between a value of target bitrate and a quantization factor value.

The step 420 consists in obtaining several video chunks, for instance ten to twenty chunks representative of the natural diversity of the targets. A motion detector of the camera can be used to detect motion and thus, to obtain video chunks with moving targets. The recording duration depends on the time it takes to get enough targets to reach statistical significance (10 to 20 targets is generally enough). Depending on the case, it can take only few minutes to several hours (if very few targets are spotted per hour). In order to avoid waiting, it is possible to use chunk fetching instead of chunk recording (i.e. if the camera had already been used prior to the calibration step, the corresponding videos may be retrieved and used).

After being obtained, the chunks are analyzed to detect targets (step 425) to make it possible to estimate their size and optionally their velocity (step 430). This estimating step may comprise performing a statistical analysis of the values of the parameters of interest (e.g. target size, target velocity). Next, the mean, median, or any other suitable value extracted from the distribution of parameter values is computed and used as the value of reference. The region of interest (ROI) as defined by the user can be taken into account to filter the results and to only consider the targets inside the ROI.

Step 430 may also comprise the computation of some needed objective image parameters like, for example blur, noise and contrast. While the determination of some objective image parameters may be alternatively done during operation. The actual choice of the objective image parameters to be calculated during calibration also depends on the objective image parameters that have been used to determine the quality function during the learning phase.

The velocity of targets can be very accurately derived by tracking some points of interest of the target, e.g. with Lucas-Kanade tracking method. By using this in combination with a background subtraction method (e.g. the known MOG or MOG2 method, i.e. the Gaussian Mixture-based Background/Foreground Segmentation), it is possible to avoid the detection of the fixed points of interest from the background and thus, to determine velocity with high accuracy even with blurry targets.

The target velocity is simply the main velocity of its corresponding points of interest. It is possible to use additional target detection methods, so as to assign points of interest to their respective targets but this is usually not necessary since statistically there is often no difference between using the velocity of targets, and directly using the velocity of points of interest, for the final statistical computation.

Figure 5:
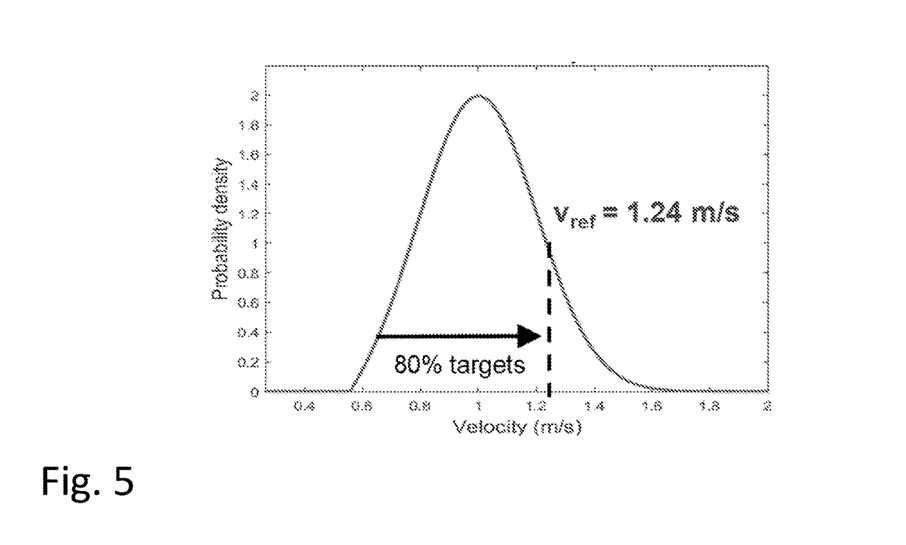
FIG. 5 illustrates an example of the distribution of the target velocity.

FIG. 5 illustrates an example of the distribution of the target velocity (or, similarly, the distribution of the velocity of the points of interest). From such a representation, a target velocity value may be obtained. For the sake of illustration, it can be chosen so as to correspond to the mean velocity for given targets. For the sake of illustration, one can choose a value corresponding to the "median 80%", i.e. a velocity value such that 80% of velocities are under this value and 20% of velocities are over this value.

The target size can be obtained through methods as simple as background subtraction, or more sophisticated ones like target detection algorithms (e.g. face recognition, human detection, or license plate recognition), which are more directly related to the detection of the targets corresponding to the task. Deep learning methods are also very effective. Outliers can be removed by using consensus-derived methods, or by using combinations of background subtraction and target detection at the same time. However, since only statistical results are obtained, it does not matter if some errors exist with such algorithms, since the errors should be averaged out to zero. This tolerance to errors makes such methods robust.

Figure 6:
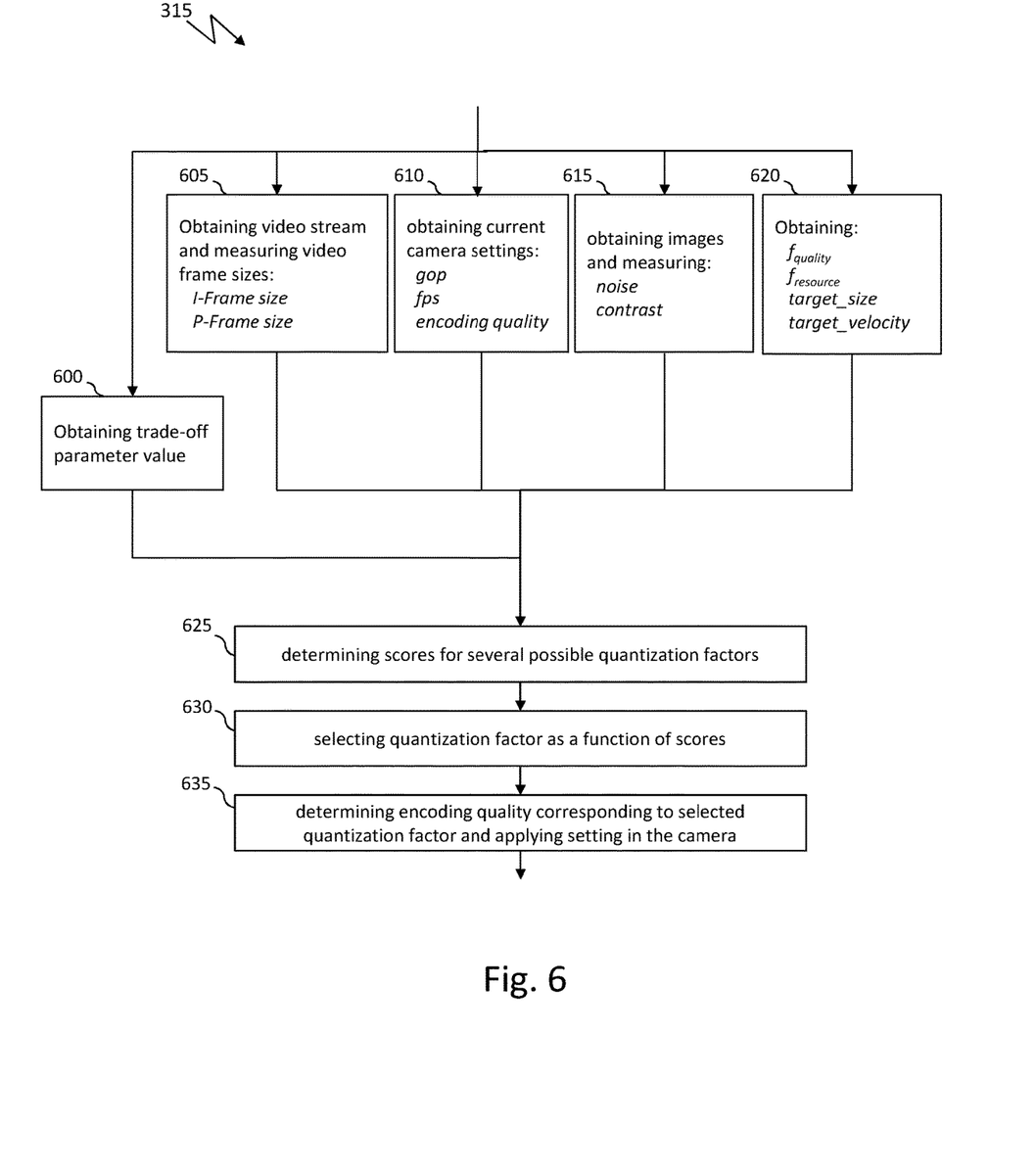
FIG. 6 illustrates an example of steps for determining new camera settings during the operational use of a camera, without perturbing the use of the camera.

FIG. 6 illustrates an example of steps for determining new camera settings during the operational use of a camera, without perturbing the use of the camera. This corresponds to step 315 in FIG. 3a. As described previously, the operation phase aims at improving camera settings, preferably at determining optimal (or near-optimal) camera settings for a current mission, current environmental conditions and according to the resource consumption, without perturbing significantly the use of the camera.

As illustrated, the first steps 600 to 620 are directed to obtaining the various parameters values that may be used for the optimization.

Step 600 consists in obtaining the trade-off parameter value β. It can correspond to a value to be tested if we are running the testing phase 310, otherwise it corresponds to the nominal value chosen by the user in 320.

Step 605 consists in measuring the average size of I-Frames and P-Frames with the current camera settings and the current environmental conditions. As example, these values can be obtained in real-time with a network sniffer which:

Receives raw network packets from a socket in promiscuous mode,
Filters the network packets for the IP address of the targeted camera,
Parses the headers of the filtered packet headers,
Detects the start and the type of a new video frame,
Computes the size of I-Frames and P-Frames with the payload size of the received packets.

Step 610 consists in obtaining the current camera settings, especially the current encoding quality, and the parameters that allow the computation of the video stream bitrate (e.g. Group Of Picture, frame rate . . . ). As example, these parameters can be obtained by reading registers in the camera through HTTP requests (HyperText Transfer Protocol). The relation between encoding quality and quantization factor determined during the calibration phase 310 is used to retrieve the current quantization factor value.

Step 615 consists in obtaining few images (e.g. snapshots) and measuring the current noise and contrast of images. As example the noise can be measured by computing the difference of pixels values between two consecutive snapshots for the areas corresponding to the background (i.e. without targets in motion). According to embodiments, measurement of the contrast comprises the steps of:

determining the histogram of the image pixel values, for each channel (i.e. for each component), that is to say counting the number of pixels $c_i$ for each possible pixel value (for example for i varying from 0 to 255 if each component is coded with 8 bits),
computing the Shannon entropy according to the following relation (n is the total number of pixels):

$$E = -\sum_{i=0}^{255} \frac{c_i}{n} \log_2\left(\frac{c_i}{n}\right)$$

computing the contrast from the entropy according to the following relation:

$$\text{contrast} = \frac{2^{entropy}}{2^{max\_entropy}}$$

where, for example, max_entropy is equal to 8 when the processed images are RGB images and each component is encoded over 8 bits.

Step 620 consists in obtaining the $f_{quality}$ and $f_{resource}$ functions as determined in the learning phase 300, as well as the target size and the target velocity as determined in the calibration phase 305.

Then, once all parameters are known, the step 625 consists in computing all the possible scores of the equation:

$$fscore = f_{quality} - \beta * f_{resource}$$

It means that:
All the possible quality scores (i.e. for the different possible values of the quantization factor Qp) are computed using the quality function and the current values of noise and contrast (in addition to the static values of target size and target velocity).
All the possible resource scores (i.e. for the different possible values of the quantization factor Qp) are computed using the resource function, the current noise, the current average size of I-Frames and P-Frames, the current GOP, and the current fps. More precisely, the current noise, the current size of I-Frame and $f_{resource}$ (sub-function dedicated to I-Frame) are used to get the expected new I-Frame size for each possible value of quantization factor. Also, the current noise, the current quantization factor, the current size of P-Frame and $f_{resource}$ (sub-function dedicated to P-Frame) are used to get the expected new P-Frame size for each possible value of quantization factor. The expected bitrate for each possible value of the quantization factor is computed with the equation: fps* (I_Frame_Size+(GOP−1)P_Frame_Size)/GOP. The obtained bitrate may be normalized to have a score of resource consumption between 0 and 1. In case of CBR mode, the expected bitrate does not need to be computed as each quantization factor value directly corresponds to a target bitrate (as determined in the calibration step).
Then all the possible total scores are computed using the formula:

$$fscore = quality\_score - \beta * resource\_score.$$

Step 630 consists in selecting the optimized quantization factor. The optimized value of the quantization factor Qp is the value that produces the maximum total score.

Step 635 consists in using the look-up table from the calibration phase 305 to get the corresponding encoding quality to set in the camera. It is applied if this optimized value is different from the current setting. In case of CBR mode, step 635 consists in determining the target bitrate to set in the camera corresponding to the selected quantization factor.

As a variant, the encoding quality is not the only parameters to set, for instance there may be the image resolution as well. In such case, fquality and fresource are computed for all possible couple of values for the quantization factor and the image resolution.

It is to be noted that this example focus on the determination of the encoding quality setting of the camera to optimize the chosen trade-off. The maximum shutter speed value can be set according to the target velocity obtained at the calibration step. The same method may be used for the determination of any other camera setting, for example the image resolution, according to embodiments.

Figure 7:
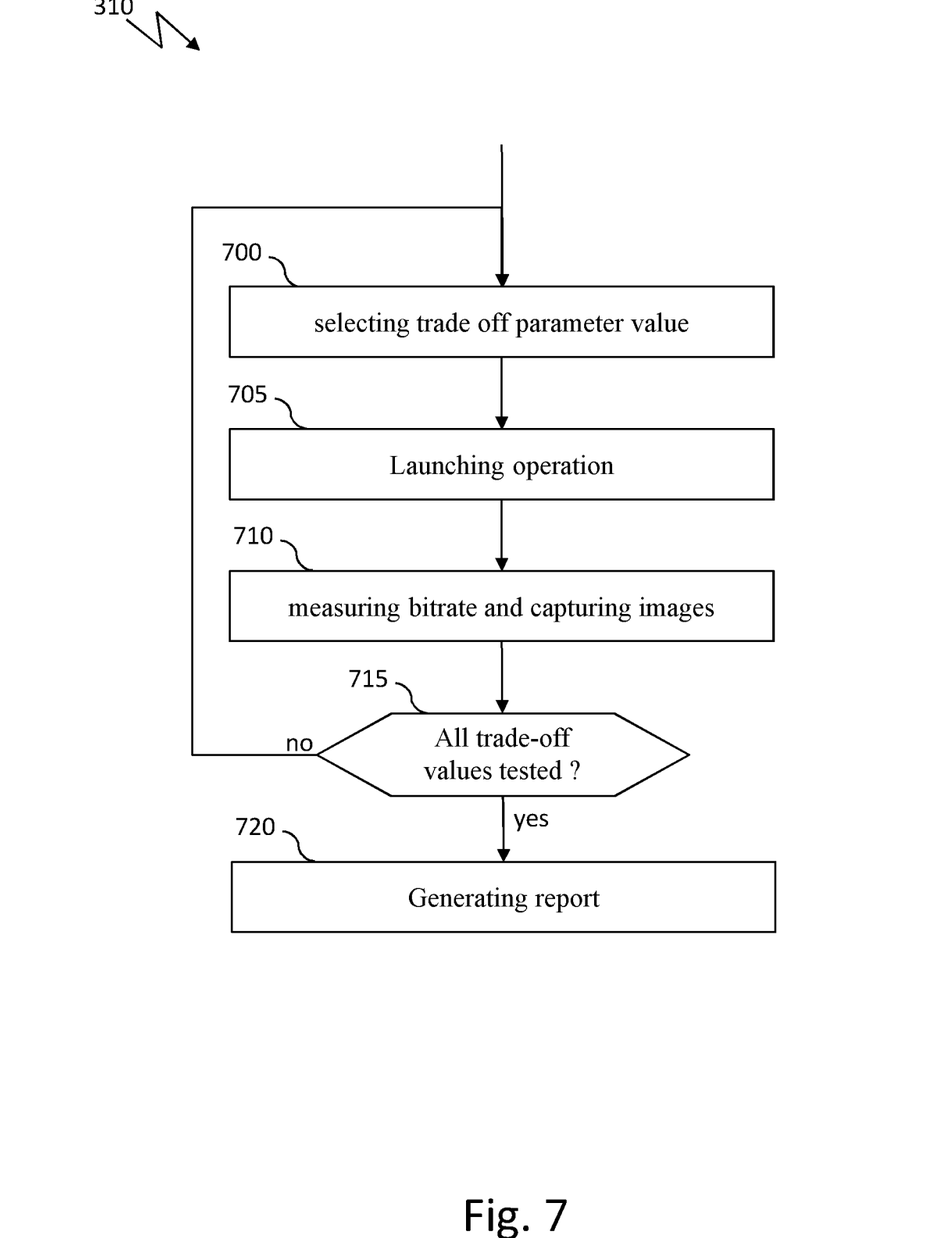
FIG. 7 is a block diagram illustrating an example of steps carried out during a testing phase of an auto-setting method as illustrated in FIG. 3b.

FIG. 7 is a block diagram illustrating an example of steps carried out during a testing phase of an auto-setting method as illustrated in FIG. 3*b*.

In step 700 a value of the trade-off parameter β is selected. In step 705, the operation phase 315 is launched for each camera with the selected β value. In step 710, the average bitrate of each video stream is measured and some samples of images are captured for each camera. The duration of this measurement can be set in advance or interrupted if the bitrate does not fluctuate above a given threshold along the time, meaning that the environmental conditions are almost constant.

In step 715, it is checked if all values of β have been tested. If yes, the final report can be generated and submitted to the customer.

As a variant the testing phase may be launched several times at different time of the day in order to produce several reports, each report corresponding to specific conditions, for instant day and night or corresponding to different affluence in a public area.

Figure 8:
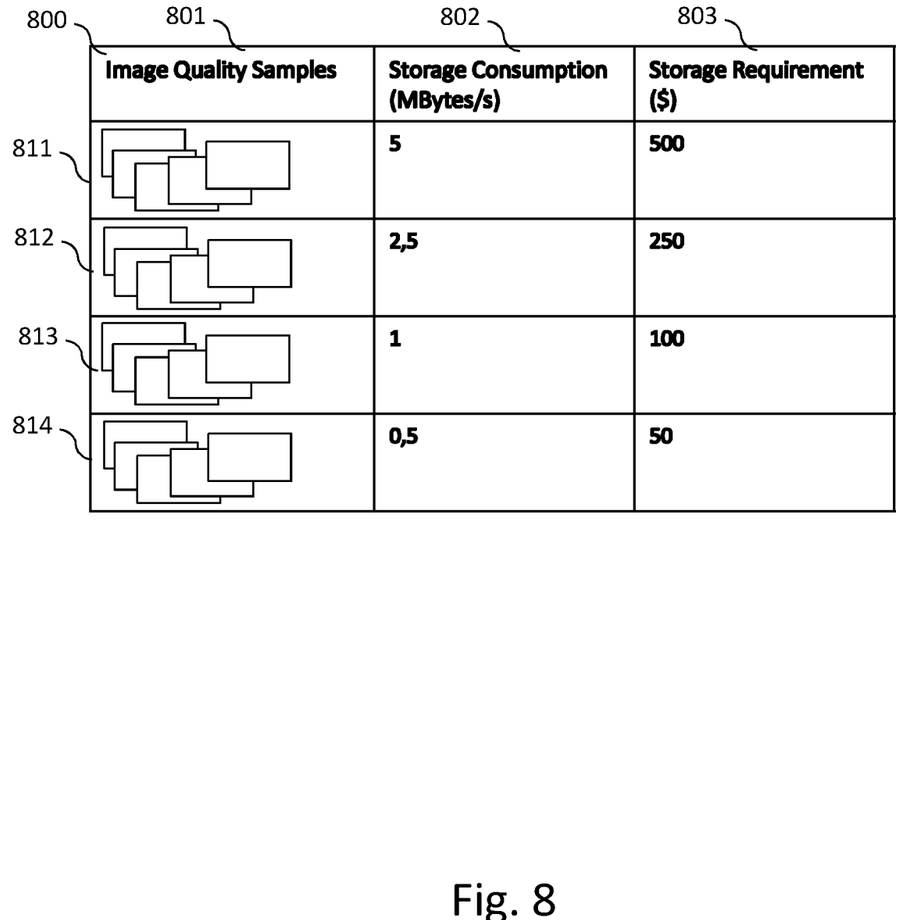
FIG. 8 illustrates an example of the report generated during a testing phase as illustrated by FIG. 3b.

FIG. 8 illustrates an example of the report generated during the testing phase. Typically, there is one table 800 per camera. As an alternative, there may be a single table 800 for all the cameras, or a single table 800 for a sub-set of cameras.

The column 801 provides images samples, the column 802 provides the average storage consumption (the bitrate may be used as metric), and the column 803 provides the storage requirement (the hardware cost may be used as metric).

Each row 811, 812, 813, 814 corresponds to one value of trade-off parameter tested during the testing phase 310.

The customer can use this report to select the appropriate trade-off quality/cost. He may choose a same trade-off for all cameras, or a trade-off per group of cameras, or even a trade-off per camera depending on the requirement and the time he wants to spend. To ease the decision, some automatic calculations can be proposed to sum the storage cost per group of cameras and then for all cameras.

As an alternative, the customer or the system integrator may define a maximum total cost for storage. Then automatically, the trade-off parameter β is selected for each camera. To obtain this result, the maximum allowed storage cost is divided per the number of cameras to get the maximum storage cost per camera (i.e. the storage requirement as in columns 803). Then each table 800 is used to retrieve the trade-off value (per camera) corresponding to this maximum storage cost.

While the invention has been illustrated and described in detail in the drawings and foregoing description, such illustration and description are to be considered illustrative or exemplary and not restrictive, the invention being not restricted to the disclosed embodiment. Other variations on the disclosed embodiment can be understood and performed by those skilled in the art, in carrying out the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of setting values of camera settings of a camera, the method comprising:
    determining a plurality of sets of objective image parameters values of images captured by the camera, the value of at least one camera setting being different for each set of objective image parameters;

obtaining a trade-off value representative of a trade-off between the quality and the resource consumption of images captured by the camera;

determining for each set of objective image parameters values, a quality value representative of a quality of the images captured by the camera, and a resource consumption value representative of resource consumption for storage of the images captured by the camera;

determining a value of the at least one camera setting optimizing a trade-off between the quality and the resource consumption according to the trade-off value based on the determined quality values and resource consumption values; and setting the value of the at least one camera setting to the determined value.

2. The method of claim 1, wherein determining a plurality of sets of objective image parameters values of images captured by the camera comprises:

obtaining relationships between camera settings and at least some of the objective camera parameters; and determining some of the objective image parameters values from the camera settings and from the obtained relationships between the camera settings and at least some of the objective image parameters.

3. The method of claim 2, wherein the relationships between the camera settings and at least some of the objective camera parameters are obtained during a preliminary calibration phase by measuring the objective camera parameters on images captured by the camera.

4. The method of claim 1, wherein determining a plurality of sets of objective image parameters values of images captured by the camera comprises:

determining some of the objective image parameters values by measuring the objective camera parameters values on the images captured by the camera.

5. The method of claim 1, wherein determining for each set of objective image parameters values, a quality value and a resource consumption value comprises:

obtaining a first relationship between an objective image parameter and a quality;

obtaining a second relationship between an objective image parameter and a resource consumption; and determining the quality value and the resource consumption value based on the first and the second relationships, and based on the set of objective image parameters values.

6. The method of claim 5, wherein the first and second relationships are obtained during a preliminary learning phase on a set of images.

7. The method of claim 1, wherein determining the value of the at least one camera setting comprises:

determining a score function corresponding to the trade-off of the quality and the resource consumption, for all possible values of the at least one camera setting; and determining the camera setting value that maximize the value of the score function.

8. The method of claim 1, wherein the camera setting is the encoding quality.

9. The method of claim 1, wherein the camera setting is the resolution of images.

10. The method of claim 1, wherein the camera setting is the frame rate.

11. The method of claim 1, wherein the method further comprises a testing phase comprising:

obtaining a plurality of sets of sample images for a corresponding plurality of trade-off values;

determining the resource consumption value associated with each set of sample images;

presenting the sets of sample images along with their associated resource consumption;

obtaining a trade-off value corresponding to a set of sample images selected by a user.

12. A non-transitory computer-readable storage medium storing instructions of a computer program for implementing the method according to claim 1.

13. A device for setting values of camera settings of a camera, the device comprising a microprocessor configured for carrying out the steps of:

determining a plurality of sets of objective image parameters values of images captured by the camera, the objective image parameters being dependent on the camera settings, the value of at least one camera setting being different for each set of objective image parameters;

obtaining a trade-off value representative of a trade-off between the quality and the resource consumption of images captured by the camera;

determining for each set of objective image parameters values, a quality value representative of a quality of the images captured by the camera, and a resource consumption representative of resource consumption for storage of the images captured by the camera;

determining a value of the at least one camera setting optimizing the trade-off between the quality value and the resource consumption according to the trade-off value; and setting the value of the at least one camera setting to the determined value.

* * * * *